(12) United States Patent
DeWitt, Jr. et al.

(10) Patent No.: US 10,605,653 B1
(45) Date of Patent: Mar. 31, 2020

(54) AMBIENT LIGHT DETECTOR DISPENSER SECURITY MONITORING SYSTEM

(71) Applicant: FlintLoc Technologies, LLC, Lampasas, TX (US)

(72) Inventors: C. Owen DeWitt, Jr., Lampasas, TX (US); Robert Reasons, Lampasas, TX (US)

(*) Notice: Subject to any disclaimer, the term of this patent is extended or adjusted under 35 U.S.C. 154(b) by 0 days.

(21) Appl. No.: 16/215,643

(22) Filed: Dec. 11, 2018

(51) Int. Cl.
| | | |
|---|---|---|
| G01J 1/42 | (2006.01) | |
| G08B 13/02 | (2006.01) | |
| G05D 7/06 | (2006.01) | |
| G01J 1/44 | (2006.01) | |

(52) U.S. Cl.
CPC .............. *G01J 1/4204* (2013.01); *G01J 1/44* (2013.01); *G05D 7/06* (2013.01); *G08B 13/02* (2013.01)

(58) Field of Classification Search
CPC ........................... F21W 2131/301; G09G 3/32
USPC ...................................................... 340/545.1
See application file for complete search history.

(56) References Cited

U.S. PATENT DOCUMENTS

| | | | | |
|---|---|---|---|---|
| 4,441,602 A | * | 4/1984 | Ostroski .................. | G07D 5/02 194/318 |
| 2008/0128453 A1 | * | 6/2008 | Burckholter ............. | B67D 7/34 222/75 |
| 2010/0090855 A1 | * | 4/2010 | Wolf ...................... | B67D 7/067 340/686.6 |
| 2012/0120401 A1 | * | 5/2012 | Valsesia ............... | G01N 21/274 356/445 |
| 2015/0028751 A1 | * | 1/2015 | Dobbins ............ | H05B 33/0854 315/155 |
| 2015/0148942 A1 | * | 5/2015 | DeWitt ................ | B67D 7/3218 700/231 |
| 2017/0235014 A1 | * | 8/2017 | Grisak ..................... | G01V 8/14 356/622 |

* cited by examiner

*Primary Examiner* — Fabricio R Murillo Garcia
(74) *Attorney, Agent, or Firm* — Furr Law Firm; Jeffrey Furr, Esq.

(57) ABSTRACT

The invention is a dispenser security system which has an ambient light sensor to detect tampering with a fuel dispenser. The ambient light sensor will be used to detect the delta change in light over time. If the delta change occur within a certain criteria then a thief is determined to be occurring and an alarm or warning is sent out. The ambient light sensor is located within a control box within the fuel dispenser unit.

15 Claims, 9 Drawing Sheets

US 10,605,653 B1

AMBIENT LIGHT DETECTOR DISPENSER SECURITY MONITORING SYSTEM

CROSS-REFERENCES TO RELATED APPLICATIONS (IF ANY)

None

BACKGROUND OF INVENTION

Field of the Invention

The present invention is directed to a providing Dispenser Security Monitoring System more particular one that use an ambient light sensor

Background

Fuel theft from retail dispensers is a significant source of economic loss for fuel retailers. Current fueling facilities rely on remote monitoring of the fueling process by fuel retailer personnel and "self service" dispensing of the fuel into the vehicle, making the facilities vulnerable to theft of fuel. Often, by the time the monitoring personnel becomes aware of the theft, the thief has already left the facility and the loss has already occurred. When diesel fuel is stolen by a driver of an over-the-highway tractor, a large amount of fuel can be lost in a single theft. Placement of credit card skimming devices has also become a major issue for fueling devices!

Fuel is stolen from retail dispensers using many techniques. For example, doors or panels on the fuel dispenser can be opened or removed to provide access to internal metering components of the dispenser such as pulsars. The metering component can be disabled so that fuel may be pumped from the dispenser without triggering any indication of fuel flow. In other cases, the dispenser is placed in a programming mode that is normally used to change operating characteristics of the fuel dispenser. When the dispenser is in programming or stand alone mode, fuel can be pumped from the dispenser without triggering any indication of fuel flow.

Thieves have even gone to the extremes of drilling holes into the sides and covering the holes with a sticker. Thieve can also place skimmers in the fuel dispensers to steal credit card information.

There is still room for improvement in the art.

SUMMARY OF THE INVENTION

The invention is a dispenser security system controls one or more fuel dispensing components to prevent the flow of fuel from the dispenser if the security system detects that dispenser is being tampered with. The dispenser security system includes an ambient light sensor that detects sudden changes in light. It can be combined with other types of sensors such as vibration, magnetic and tilt. If one or more of the sensors detects tampering or is set off it send signals indicative of tampering wirelessly, a dispenser security controller receives the tampering signals, and sets an alarm and may shut off the fuel dispenser.

The system accepts a signal from any device or security component to the board. The board programming then instructs the system to take the appropriate action for outputs. Outputs can vary from sending a signal to the appropriate relay to kill power (stopping fuel loss) to sending alerts to digital keypad/display as well as sending alerts through network connection as email or text. This can be done based on certain criteria as set by a user.

Further features and advantages of the invention will become apparent from the following detailed description made with reference to the accompanying drawings.

BRIEF DESCRIPTION OF THE DRAWINGS

Without restricting the full scope of this invention, the preferred form of this invention is illustrated in the following drawings.

BRIEF DESCRIPTION OF THE PREFERRED EMBODIMENTS

There are a number of significant design features and improvements incorporated within the invention.

The invention is a dispenser security system with an ambient light sensor 450 that controls one or more fuel dispensing components to prevent the flow of fuel from the dispenser if the security system detects that dispenser is being tampered with. The dispenser security system includes one or more sensors that detect and send signals indicative of tampering, a dispenser security controller that receives the tampering signals, and one or more dispenser disablement mechanisms that prevent flow of fuel from the dispenser. The dispenser security controller controls the dispenser disablement mechanisms based on inputs from the sensors.

The dispenser security controller may also activate one or more alert mechanisms or use a switch or control valve that allows the flow of fuel out of the dispenser or the flow of power to a pump that pumps fuel out of the dispenser.

The system may accept a signal from any device or security component to the board. The board programming then instructs the system to take the appropriate action for outputs. Outputs can vary from sending a signal to the appropriate relay to kill power (stopping fuel loss) to sending alerts to digital keypad/display as well as sending alerts through network connection as email or text. Sending alerts is the preferred method.

The System uses wireless technology to secure a fuel dispenser in conjunction with an IS barrier. It communicates to a panel receiver 500 that switches a relay to either send a notification and/or kill power on the single fuel dispenser so the theft is prohibited.

Figure 1:
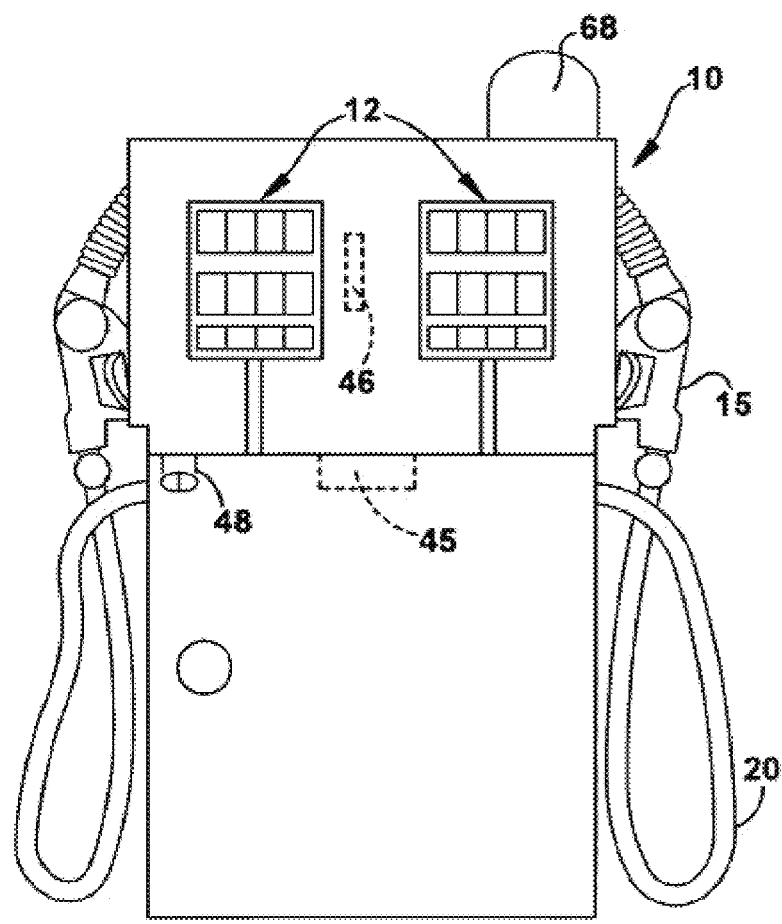
FIG. 1 is a front view of a typical retail fuel dispenser that includes a dispenser security system constructed in accordance with an embodiment of the present invention.

FIG. 1 depicts a typical retail fuel dispenser 10 that is used to pump fuel out of a storage tank 500 through a hose 20 and out of a nozzle 15. The fuel dispenser 10 includes a top enclosure that houses a dispenser control computer and readouts 12 that display information related to the fuel purchase. The dispenser control computer controls operation of the various dispenser components according to stored programming steps. In order to enable programming of the dispenser control computer, a programming enable switch is present on the dispenser. The programming enable switch must be actuated to place the dispenser control computer in a mode in which it can be programmed. When the control computer is in the programming or stand alone mode, fuel may be dispensed from the dispenser without activation of the control computer registering the fact that fuel is being dispensed from the dispenser.

Figure 2:
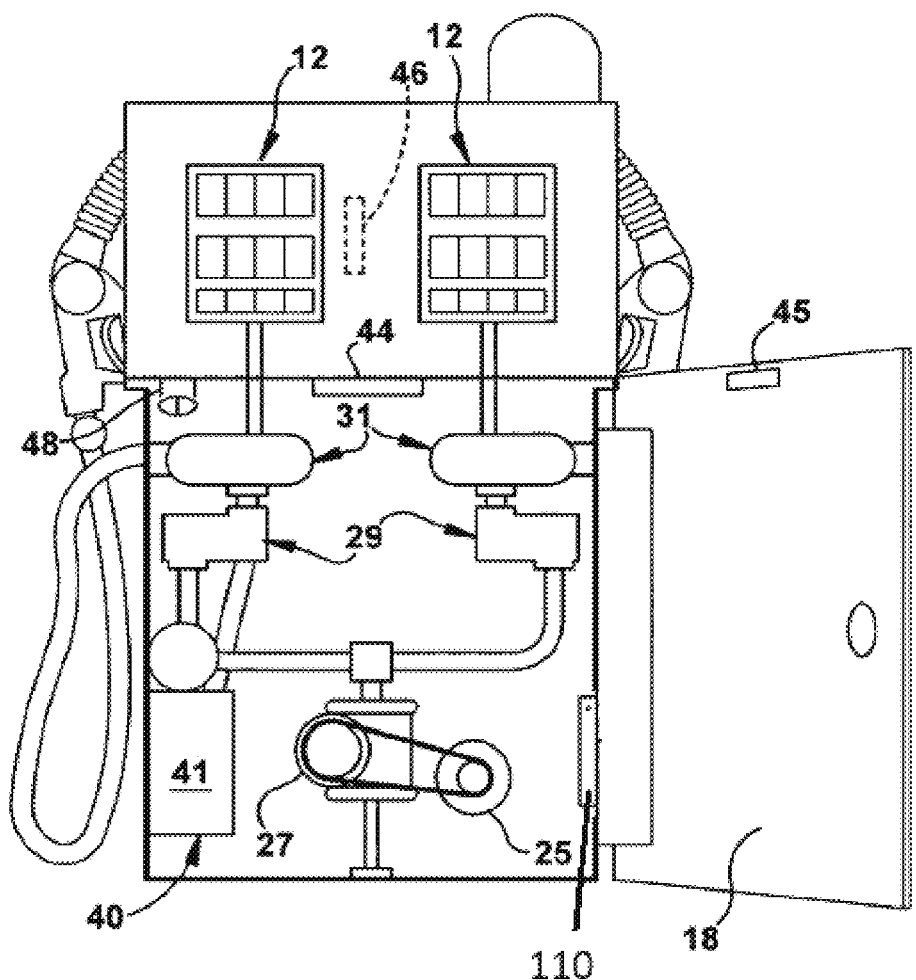
FIG. 2 is a front view of the fuel dispenser of FIG. 1 with an access panel open to show internal components.

FIG. 2 shows the retail fuel dispenser 10 with an access door 18 open to expose internal components of the fuel dispenser. A pump 27, which in this case is driven by a motor 25, draws fuel from the storage tank. The fuel flows from the pump 27 to one or more control valves 29 that control the rate of flow of fuel to the hose 20. Usually, each dispenser hose 20 has a dedicated control valve. A pulsar 31 electronically monitors a volume of fuel that is flowing from the valve to the hose. The pulsar 31 is in signal communication with the dispenser control computer and provides signals indicative of the volume of fuel flow to the dispenser control computer. The control computer displays an amount of fuel being dispensed on the dispenser displays 12.

Figure 7:
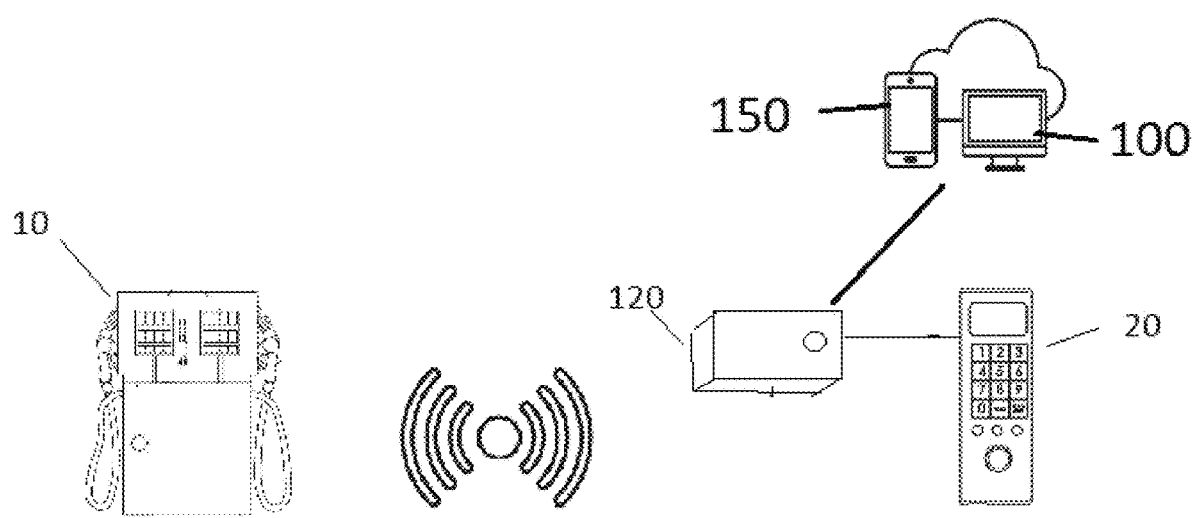
FIG. 7 displays the system sending out and receiving messages.

In most modern retail fuel establishments, the amount of fuel being dispensed by each dispenser are also communicated to a central control board panel 120 located, for example, at a remote location as shown in FIG. 7.

For the purposes of this description, the fuel dispenser components shown in FIGS. 1 and 2 are intended as examples of fuel dispenser components. It will be apparent to one of skill in the art that other fuel dispenser configurations and components can be used in various implementations of the dispenser security system. For example, the control valve and pump may be housed within the same housing. The pump may be located within the storage tank. The upper enclosure may have various configurations as well as the display 12.

In prior art, a dispenser security system 40 may include a photo sensor 140, an alarm unit 41, and an arming status indicator LED. The alarm unit 41 may also be connected to various tamper detection sensors such as a magnetic reed switch 44 mounted in the dispenser that has an associated magnet 45 mounted on a sensor access panel or door 18 and/or a vibration detector 69.

Figure 3A:
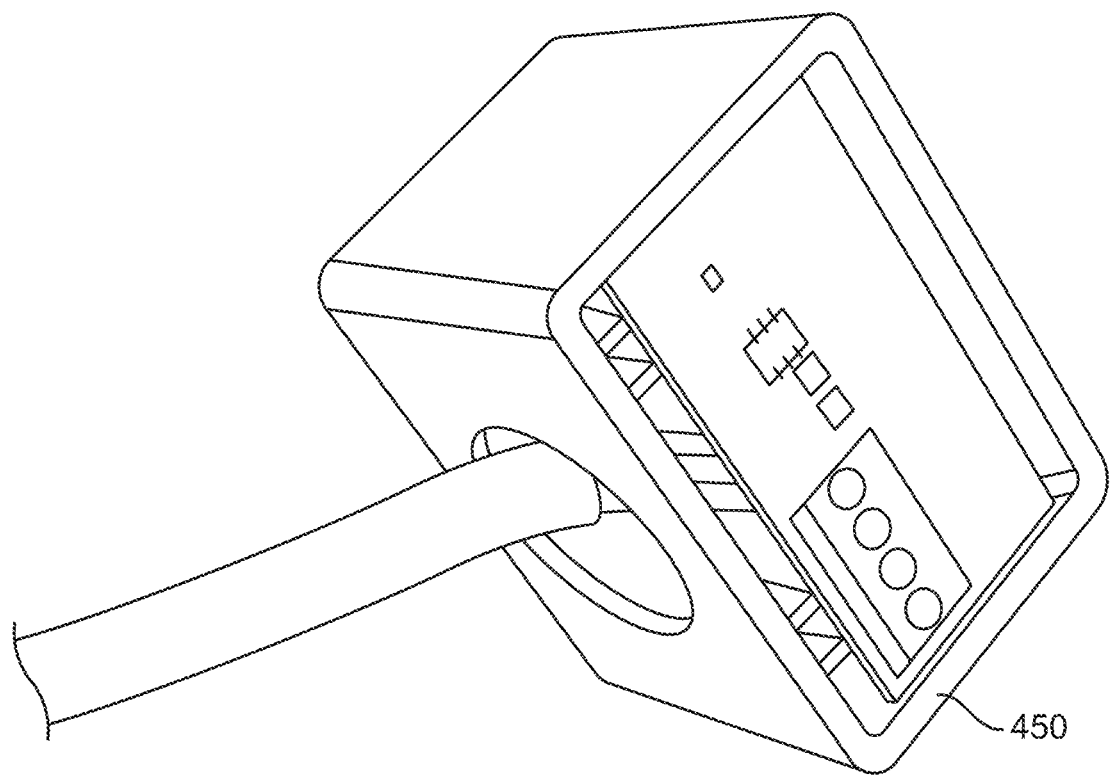
FIG. 3*a* shows the ambient light sensor.
Figure 3B:
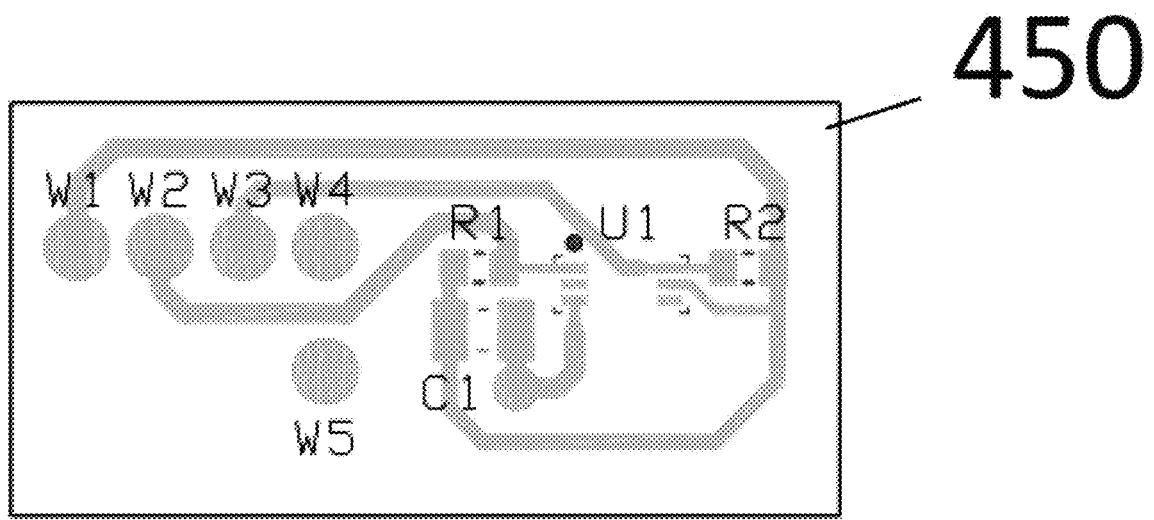
FIG. 3*b* shows a schematic of the ambient light sensor.

In the current invention, the fuel dispenser will have an ambient light sensor 450 within the dispenser 10. This will be a photonic cell that will distinguish ambient light. This ambient light sensor 450, as shown in FIG. 3a with a schematic in FIG. 3b, will be able to let the system know if someone is opening the door or cutting into the door to tamper with dispenser 10.

In the current invention, the detection system will use the ambient light sensor 450 to measure the delta of the change in light over a period of time. If the change is within a set criteria or parameter the ambient light sensor will set off an alarm. In the preferred embodiment, the detector will communicate that a breach has been detected. In the preferred embodiment, a delta of 30 minutes will not set off the alarms as this can be based on the change from day to night but a delta of five minutes or less will set off the alarm as it would indicate a potential thief and break in. The ambient light sensor 450 can measure small increases in the change of light.

It is the change of light that is measured and used to set off the alarm. It will not be set off just on the fact that light is detected. This is a significant improvement to the art.

Figure 4A:
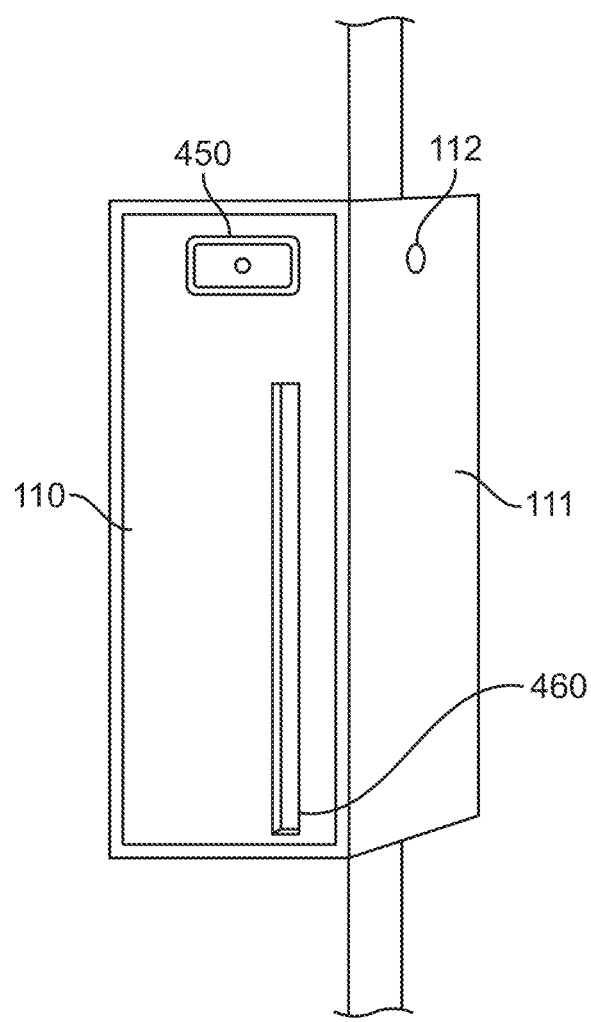
FIG. 4*a* shows the ambient light sensor in an open sensor box.
Figure 4B:
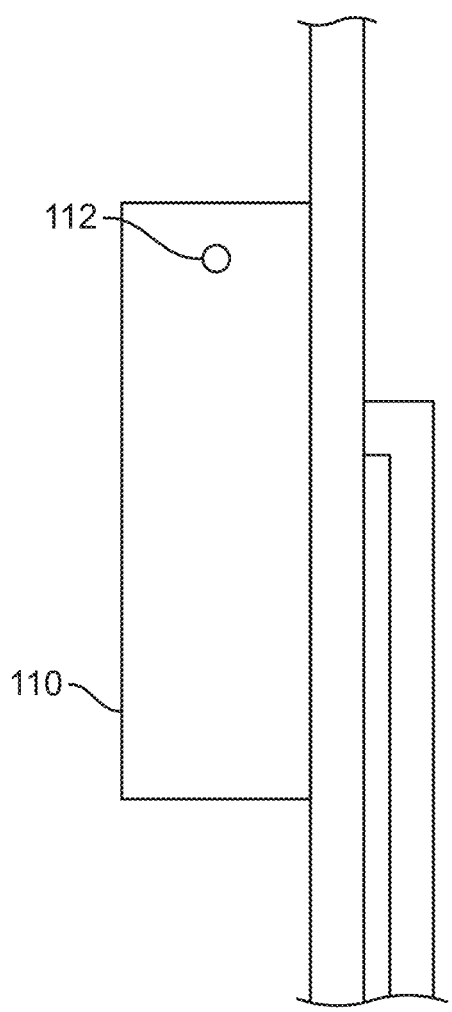
FIG. 4*b* shows a closed sensor box.

The ambient light sensor 450 will located within a control box 110 mounted on the inside of the fuel dispenser. The control box as shown in FIGS. 4a and 4b, in the preferred embodiment, will be rectangular in shape with a potential dimension of 8" by 4". The control box 110 will have a door 111 that will either slide open or open on hinges. The ambient light sensor 450 will be located on either the top or the sides of the control box 110. The door 111 will with have a small pin hole opening 112, round in the preferred embodiment, position in front of the ambient light sensor 450. The pin hole opening 112 limits the light that reaches the ambient light sensor 450 allowing for a better read on the change of light over time.

Figure 5:
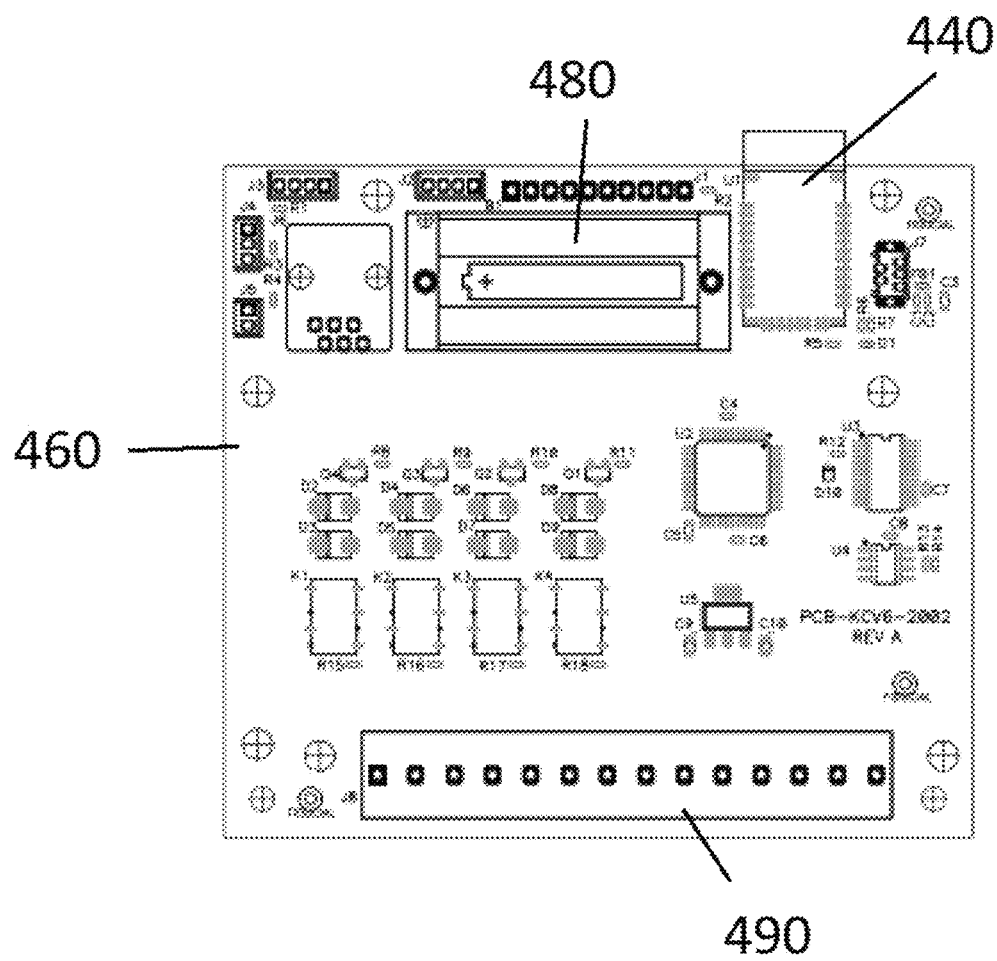
FIG. 5 displays a sample detection control circuit board.

A detection control board 460 is located within the control box 110. A schematic of the detection control board 460 is show in FIG. 5. The ambient light sensor 450 is connected to the detection control board 460. The detection control board 460 is connected to a wireless transmitter and receiver 470 which sends wireless communication to the main control panel 120 if the detection control board 460 detects a suspected tampering as shown in FIG. 7. The detection control board 460 has a back up power source such as a battery 480 in case of a power loss. The detection control board 460 has a computer processing unit 440 that receives input from the detection inputs such as the ambient light sensor 450 to determine if there has been suspected tampering and if there has been then to send a signal to the control panel 120 for action.

Figure 8:
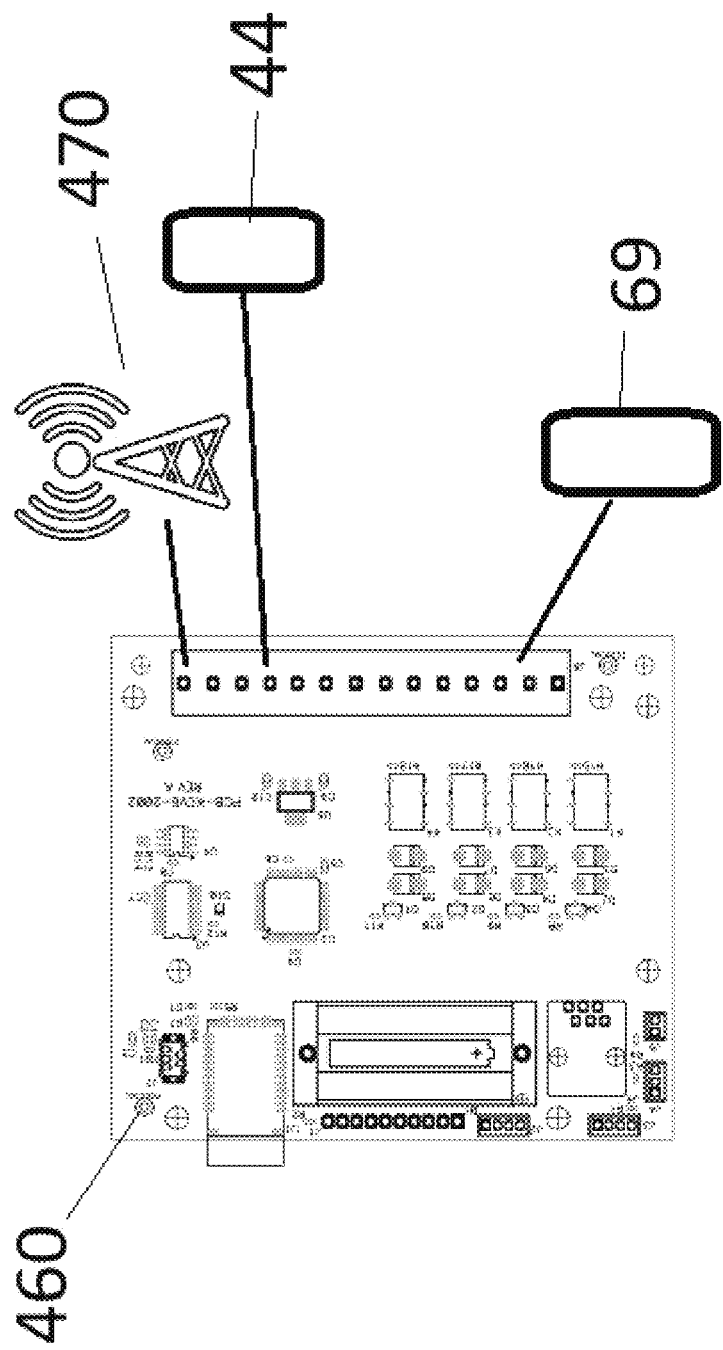
FIG. 8 shows other detection devices connecting to the central control board panel.

In the preferred embodiment, the detection control board 460 will have multiple inputs 490 for multiple detection means such as the ambient light sensor 450, a tilt detector 67, vibration detector 69 or a magnetic reed switch 44 as shown in FIG. 8.

Figure 6:
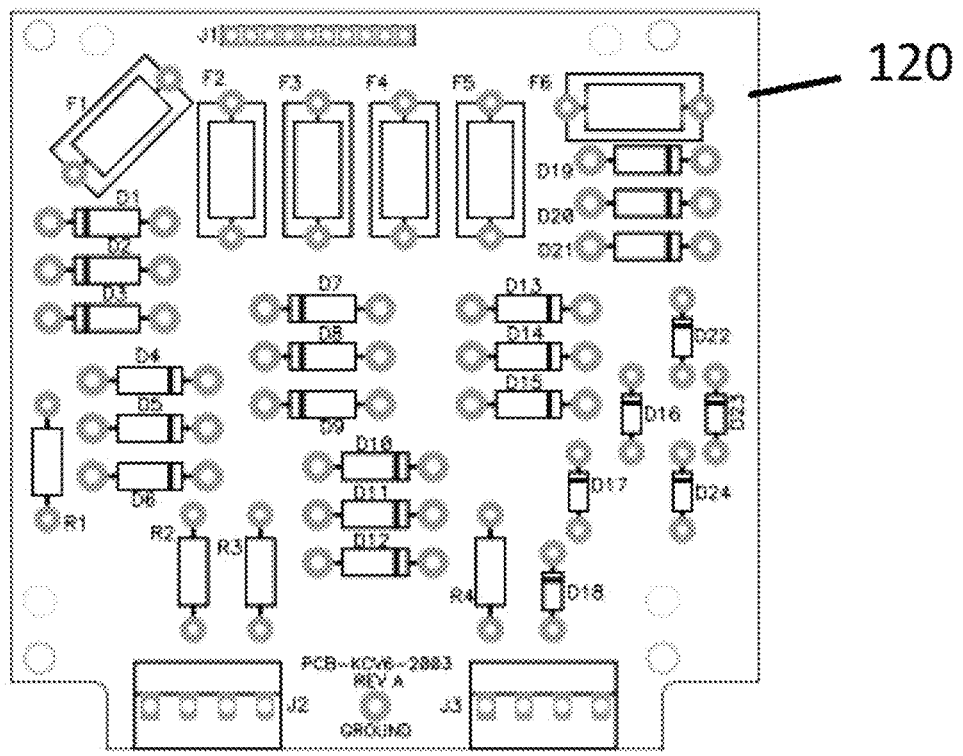
FIG. 6 displays a sample central control board panel circuit board.

The control panel 120, as shown in a schematic in FIG. 6, is used to send out warnings when the detection system enable operation of the pump 10 when dispensing is approved or disable operation of the pump 10 when dispensing has not been approved.

As discussed above, a microprocessor changes between the armed mode and disarmed mode in response to RF signals from the remote controller board 120 that is capable of sending an arming signal, a disarming signal, and a reset signal. The specific frequency of the signals periodically changes to a different randomly selected signal. The method of selecting frequencies is synchronized between any receiver and the control board 120 to protect against unauthorized signals communicating with the microprocessor to disarm or reset the alarm unit. In addition, a "panic" feature may be included in which the alarm may be triggered by pressing a panic button. The control board 120 treats the panic input as a tamper detection input.

The Control boards 120 and relay breakers are serialized to manage the power source 300 where they can disable dispensing thus stopping fuel theft which also have a manual override feature.

The wireless receiver 125 receives wireless signals and route the signals to a computer board or microprocessor 145.

The system will accept a signal from any device or security component to the board 120. The board 120 programming as stored in an electronic medium such as a hard drive 165 then instructs the system to take the appropriate action for outputs. Outputs can vary from sending a signal to the appropriate electrical breaker to kill power (stopping fuel loss) to sending alerts to digital keypad/display as well as sending alerts through network connection as SMS messages, recorded messages, email or text to computers 100 or phones 150

The system uses wireless technology to secure a fuel dispenser 10.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A dispenser security system for use with a dispenser comprising; a dispensing mechanism that controls the dispensing of fluid from the dispenser, the dispenser security system comprising an ambient light sensor used to measure a delta change in light to detect potential tampering, where the ambient light sensor is located within a control box with a pin hole opening located in front of the ambient light sensor, where the ambient light sensor is connected to a detection control board, and where if the detection control board detects suspected tampering the detection control board sends a signal to a control panel.

2. The dispenser security system of claim 1 wherein the dispenser security system includes other tamper detection devices.

3. The dispenser security system of claim 1 wherein the control box has a door that opens.

4. The dispenser security system of claim 3 wherein the pin hole opening is located in the door.

5. The dispenser security system of claim 1 wherein multiple detection means are connected to the detection control board.

6. The dispenser security system of claim 1 wherein the signal is sent wirelessly.

7. The dispenser security system of claim 1 wherein the system can disable operation of the dispensing mechanism.

8. The dispenser security system of claim 1 wherein the control panel can disable operation of the dispensing mechanism.

9. The dispenser security system of claim 1 wherein the delta is five minutes or less.

10. The dispenser security system of claim 1 wherein when tampering is detected an alarm is triggered.

11. The dispenser security system of claim 1 wherein the ambient light sensor is a photonic cell.

12. The dispenser security system of claim 1 where the detection control board has a backup power source.

13. A device to be used as a dispenser security system for use with a dispenser security system; comprising an ambient light sensor used to measure a delta change in light to detect potential tampering where the ambient light sensor is located within a control box with a door that opens where the door has a pin hole opening located in front of the ambient light sensor where the ambient light sensor is connected to a detection control board where if the detection control board detects suspected tampering the detection control board sends a signal to a control panel.

14. The device of claim 13 wherein the signal is sent wirelessly.

15. The device of claim 13 wherein the delta is five minutes or less.

* * * * *